(12) United States Patent
Mahan et al.

(10) Patent No.: US 7,092,934 B1
(45) Date of Patent: Aug. 15, 2006

(54) METHOD AND APPARATUS FOR ASSOCIATING INFORMATION WITH AN OBJECT IN A FILE

(75) Inventors: Laura Ann Mahan, Kanata (CA); Kenneth Steven Shaun Illingworth, Kanata (CA); Kelly Anne K. Forbes, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/466,640

(22) Filed: Dec. 20, 1999

(51) Int. Cl.
*G06F 17/30* (2006.01)

(52) U.S. Cl. .............. 707/3; 707/1; 707/10; 707/103 X

(58) Field of Classification Search .............. 707/1–10, 707/102, 103 X; 709/102, 201, 203; 715/500
See application file for complete search history.

(56) References Cited

U.S. PATENT DOCUMENTS

| | | | |
|---|---|---|---|
| 5,428,784 A * | 6/1995 | Cahill, Jr. ................... | 709/206 |
| 5,623,652 A * | 4/1997 | Vora et al. .................... | 707/10 |
| 5,742,768 A | 4/1998 | Gennaro et al. ........ | 295/200.33 |
| 5,842,009 A * | 11/1998 | Borovoy et al. ................ | 707/1 |
| 5,935,210 A * | 8/1999 | Stark .......................... | 709/224 |
| 6,216,122 B1 * | 4/2001 | Elson ........................... | 707/3 |
| 6,636,888 B1 * | 10/2003 | Bookspan et al. .......... | 709/203 |
| 6,708,202 B1 * | 3/2004 | Shuman et al. ............. | 709/206 |

OTHER PUBLICATIONS

Article entitled "Instant Know-It-All" in PC Magazine, Dec. 1, 1999, p. 11; author unknown.

\* cited by examiner

*Primary Examiner*—Don Wong
*Assistant Examiner*—Marc R. Filipczyk
(74) *Attorney, Agent, or Firm*—Dennis R. Haszko; Borden Ladner Gervais LLP

(57) ABSTRACT

Methods and apparatus for associating information with an object in a file are disclosed. One method involves associating a search key with the object in the file, and scheduling a search for the information using the search key, for automatic future execution by a searching mechanism operable to execute scheduled searches. Another method involves initiating a pre-scheduled search for the information at a pre-scheduled time, using a search key associated with the object, and associating with the object a result of the search.

34 Claims, 5 Drawing Sheets

SEARCH TABLE

| OBJECT TABLE | SEARCH KEY | WHEN | REFINEMENTS | SEARCH URL | RESULTS URL |
|---|---|---|---|---|---|
| 66 | 68 | 70 | 72 | 78 | 80 |
| | | | | | |
| | | | | | |

METHOD AND APPARATUS FOR ASSOCIATING INFORMATION WITH AN OBJECT IN A FILE

FIELD OF THE INVENTION

The present invention relates to searching, and more particularly to methods and apparatus for scheduling and performing a search to associate information with an object in a file.

BACKGROUND OF THE INVENTION

With the proliferation of the Internet, a wide variety of search engines and search tools for locating information have become available. Typically, a user accesses a web page containing a search form from a search engine, inputs search terms into the form, and clicks on an icon labeled "search" or "start" for example, to transmit the search terms back to the search engine. The search engine then searches one or more databases for information containing the search terms, and accesses to the user one or more web pages containing the search results, typically represented by hyperlinks containing universal resource locators (URLs) identifying locations or addresses on the Internet where the information identified by the search engine may be found.

Disadvantageously, each time a user wishes to update a search he or she has previously performed, the user must usually return to the search engine's web page, complete the search form by inputting the same search terms as the previous search, then sift through the search results. Often, the user will have already seen most of the search results during the previous search. Accordingly, such updating is often a tedious and time-consuming process involving redundant effort, as the user has to repeatedly fill out the same search form and sift through the same results.

One recent search engine improvement involves a utility residing in a Windows system tray of a user's computer, which allows a user to manually initiate a search by pressing the Alt key then clicking on a word in an electronic document. The utility transmits the selected word over the Internet to a particular search engine, which then searches its databases for occurrences of the word. However, the search must still be manually initiated, and no apparent provision is made to eliminate redundant or old information that may have been previously retrieved. In addition, the user is required to first download and install the utility, which may not be feasible or permitted at a remote location such as a public access Internet kiosk, for example.

At the same time, electronic calendars such as desktop-based or web-based calendars are increasing in popularity. Many people, particularly business travelers, find it convenient to store a list of all of their scheduled meetings, appointments and tasks on a web-based calendar, to allow them to access this information from any computer terminal anywhere in the world which is connected to the Internet. Many such users would find it desirable to obtain up-to-date information about a person or company immediately prior to meeting with that person or company. However, meetings are often scheduled a week or more in advance, and accordingly, if a user performs a search at the time of scheduling, the search results may be out of date by the time the scheduled date of the meeting arrives. The user may intend to manually perform such a search shortly before the meeting, however, the user may be too hurried to interact with a search engine on the morning of a meeting, or may forget to do so.

Accordingly, there is a need for way to pre-schedule searches to be automatically conducted at a pre-scheduled time, such as several hours before a scheduled meeting, for example, and to conveniently provide the results of the search to a user.

SUMMARY OF THE INVENTION

The present invention addresses the above need by providing a method and apparatus for associating information with an object in a file. The method and apparatus cooperate to associate a search key with the object in the file and to schedule a search for information using the search key for further execution by a searching mechanism operable to execute scheduled searches.

For example, where the file is an electronic calendar and the object is the name of a person or other entity in a calendar entry, with whom a user of the calendar is scheduled to meet, the user may associate a search key designed to locate up-to-date information about that entity with the calendar entry. The user may design the search key so as to exclude information older than a certain date, or to otherwise refine the search. The user may schedule a search for information relating to the entity to be conducted at a pre-scheduled time prior to the meeting, such as three or four hours beforehand, for example. The search results may then be incorporated directly into the electronic calendar, so that when the user consults the calendar, the calendar contains hyperlinks to information relating to the entity, such as a recent news story relating to the entity, for example. The user may then simply click on a hyperlink in the user's calendar to access such information.

Additionally, if desired, the user may schedule recurring searches. For example, to obtain information on a topic relevant to monthly planning meetings, the user may schedule a recurring search to occur shortly before each meeting, and if desired, may combine such recurring searching with search refinements to exclude information more than a month old, for example.

More broadly, embodiments of the invention provide for such scheduled searching for information related to any object in any file, not merely an entity in a calendar entry of a calendar. Embodiments of the invention may be implemented in a variety of physical structures, such as a desktop computer, or may be entirely implemented in a web server such as a web-based calendar server, for example.

Associating a search key with the object may involve tagging the object and the object may be a string of text in a hypertext mark-up language (HTML) document, for example.

Scheduling the search may involve storing the search key in association with a time of execution at which the search is to be executed and in association with a tag identifying the object.

A method and apparatus according to another aspect of the invention involve initiating a pre-scheduled search for the information at a pre-scheduled time using the search key associated with the object and associating with the object a result of the search.

Initiating the search may involve invoking a search engine, which may involve addressing a universal resource locator (URL) associated with the pre-scheduled search. A program, subroutine, or scripts for example, may be run to populate search engine fields of the search engine to identify search parameters. A results URL produced by the search engine may be received by the apparatus and stored in association with the pre-scheduled search. A hyperlink may be associated with the object, the hyperlink pointing to the results URL to enable a user to quickly access information associated with the object.

In one embodiment, a table is produced, the table associating an object tag, the search key, the pre-scheduled time, the URL associated with the pre-scheduled search and the results URL with each other to identify the search.

The above methods may be executed by a processor circuit running under the direction of program codes which may be received from a computer readable medium such as a hard drive or a compact disc, for example, or which may be received as programmed code segments in a signal embodied in a carrier wave received through a wireless modem, or from the internet, for example.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
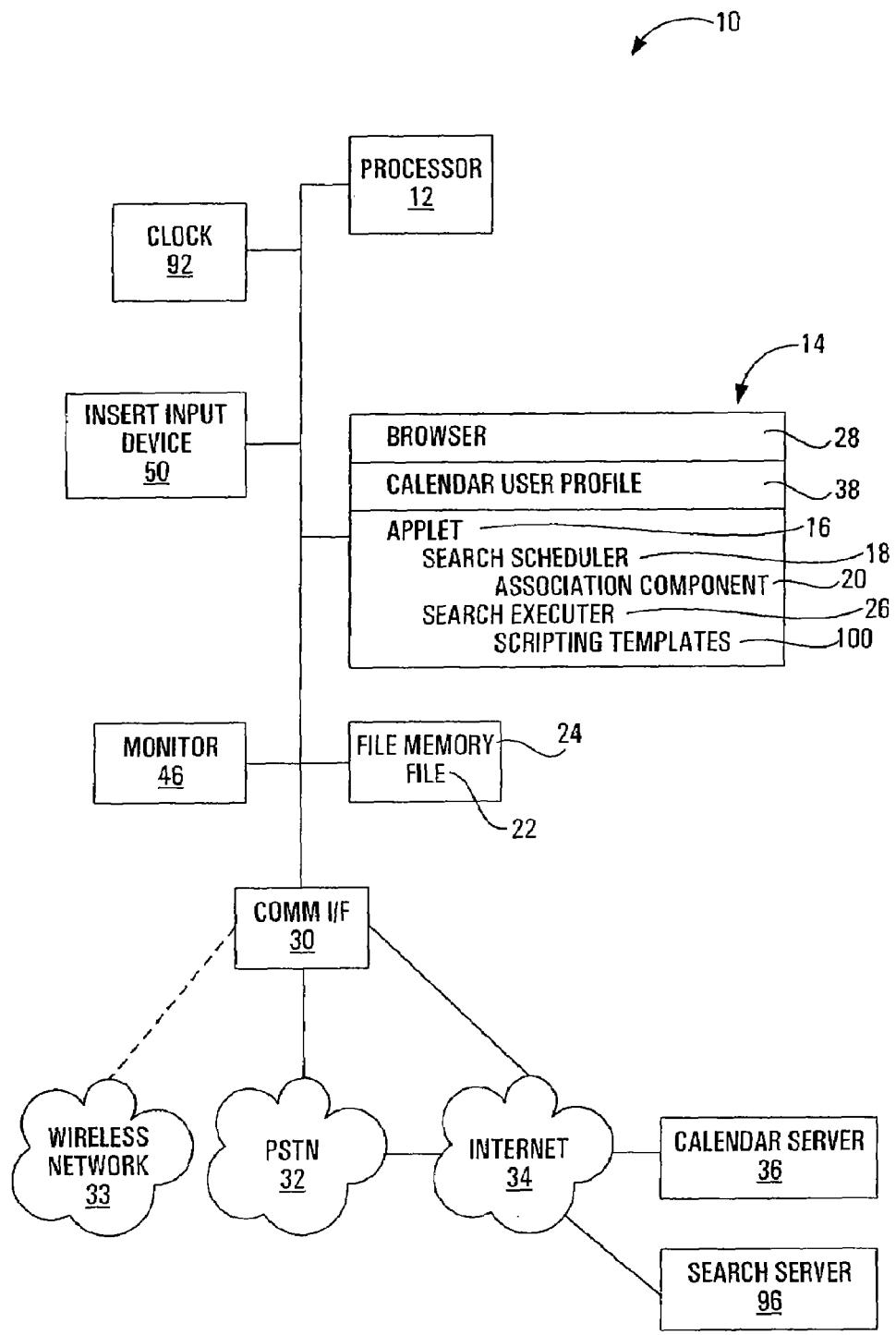
FIG. 1 is a block diagram of a system in which an apparatus for associating information with an object in a file according to a first embodiment of the invention is employed.

Referring to FIG. 1, an apparatus for associating information with an object in a file according to a first embodiment of the invention is shown generally at 10. The apparatus includes a processor 12 and a memory 14 in which is stored an applet 16 including a first code segment 18 for directing the processor 12 to function as a search scheduler. The search scheduler includes an association component 20 for associating a search key with an object stored in a file 22 stored in a file memory 24 accessible by the processor 12. In addition, the search scheduler 18 has a scheduling component operable to schedule a search for information using the search key for automatic future execution of the search by a search executor implemented by a second code segment 26 running on the processor 12, to initiate scheduled searches.

In this embodiment, the applet 16 is run in connection with a browser 28 which directs the processor 12 to establish communications through a communications interface 30 and an internet 34 to a server 36. In this embodiment, the communications interface 30 includes a cable modem or other local area network in direct communication with the public Internet. Alternatively, the communications interface may include a modem in communication with the server 36 and the Internet 34 via the public switched telephone network 32. Alternatively, the communications interface may include a modem operable to communicate with the server 36 through a wireless network 33.

In this embodiment, the server 36 hosts a calendar application, which provides calendar functions to a user of the apparatus 10. Effectively, the calendar server 36 provides to the apparatus 10, a calendar user profile 38 best shown in FIG. 2.

Figures 2, 5:
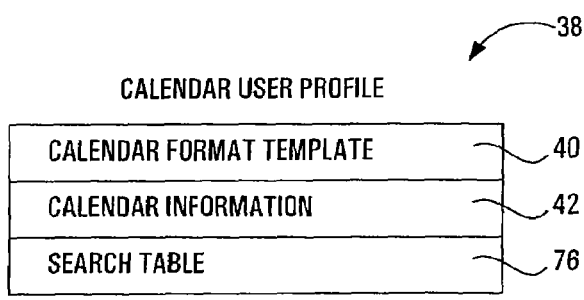
FIG. 2 is a schematic representation of a calendar user profile used and modified by the apparatus shown in FIG. 1.
FIG. 5 is a tabular representation of a search table stored in memory of the apparatus.
Figure 3:
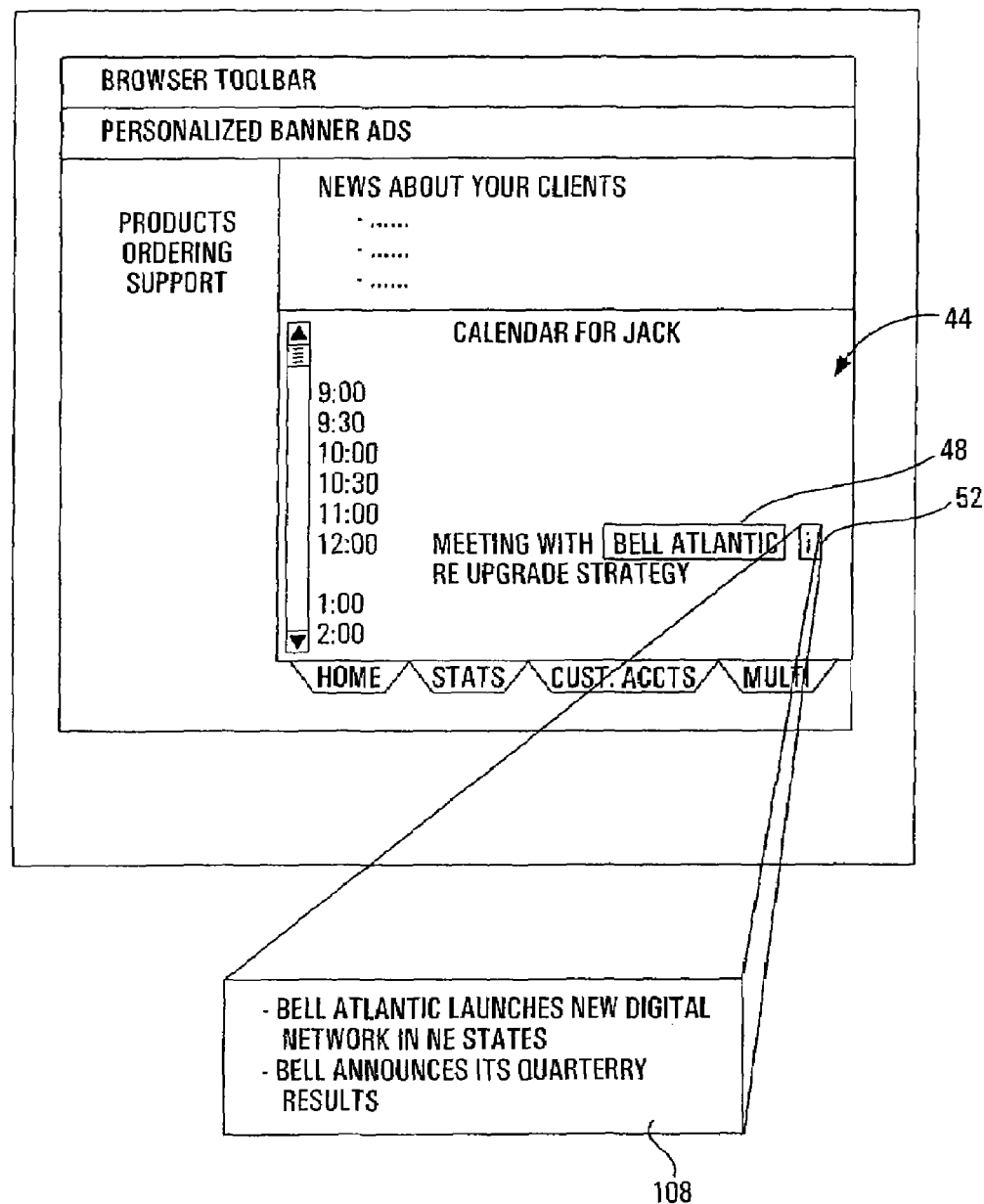
FIG. 3 is a pictorial representation of a display produced on a monitor of the apparatus shown in FIG. 1.

Referring to FIGS. 1, 2 and 3, the calendar user profile 38 provided by the calendar server 36 shown in FIG. 1 includes a calendar format template 40 and calendar information 42 which is used to populate the calendar format template, with which the browser 28 shown in FIG. 1 interacts to produce a calendar display such as that shown at 44 in FIG. 3, on a monitor 46 controlled by the processor 12 in FIG. 1.

In this embodiment the calendar format template 40 and the calendar information 42 present to the browser 28 shown in FIG. 1 a hypertext markup language (HTML) file including various objects such as textual strings, graphics or other components for causing the browser 28 to direct the processor 12 to produce the calendar display 44 shown in FIG. 3. The string "Bell Atlantic" shown at 48 in FIG. 3 is an example of such an object in a file. The calendar server 36 further cooperates with the processor 12 to store a copy of this HTML file as the file 22 in the file memory 24 shown in FIG. 1.

Referring to FIGS. 1 and 3, effectively the association component 20 associates a search key with the object in the file, in this case the string "Bell Atlantic" 48, and the search scheduler 18 schedules a search for information using the search key for automatic future execution by the search executor 26.

The particular way in the particular search key is associated with the object is explained with reference to FIG. 4 which shows a flowchart of the search scheduler.

Figure 4:
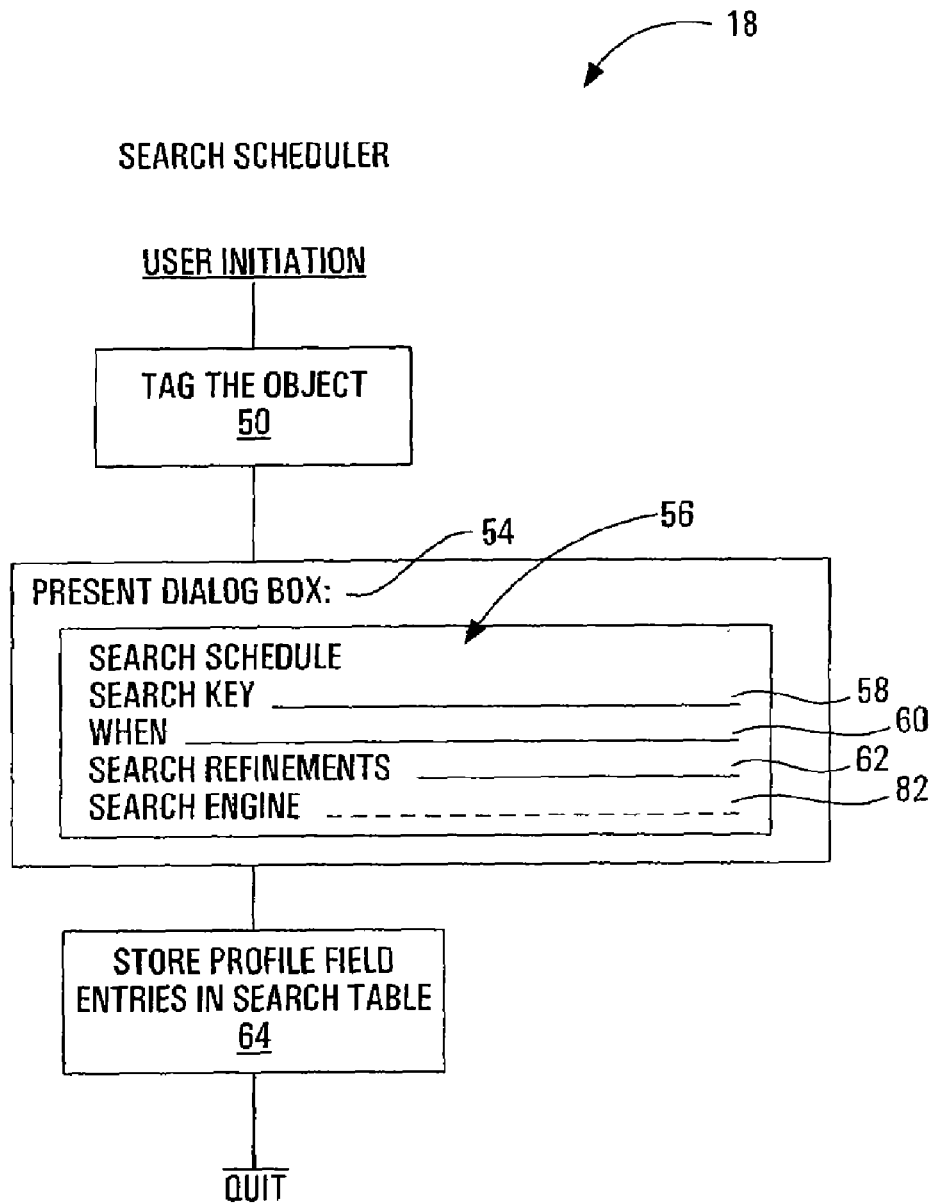
FIG. 4 is a flow chart of a search scheduler routine executed by a processor of the apparatus shown in FIG. 1.

Referring to FIGS. 3 and 4, in this embodiment, a user of the file 22 may initiate the search scheduler 18 shown in FIG. 4, by highlighting or selecting the object 48, in this case the string "Bell Atlantic", within the calendar display 44, and then executing a hot key sequence on a user input device 50 shown in FIG. 1 to cause the processor 12 to invoke the search scheduler 18. In this embodiment, the search scheduler tags the object 48 with an icon or object tag 52 which is inserted in the HTML file to cause it to visually appear adjacent the object 48.

Referring to FIG. 4, block 54 of the search scheduler 18 then directs the browser 28 and processor 12 to display on the monitor 46 a dialog box as shown at 56 in FIG. 4. In this embodiment, the dialog box includes a search key field 58, a scheduled time field 60 and a search refinement field 62. A user of the device can then populate these fields 58–62 by actuating the user input device 50 shown in FIG. 1. It will be appreciated that the user input device may include a keyboard to enable the user to enter search strings, times and dates at which the search is to be performed and further search refinements. For example, the user may refine the search by adding to the refinement field 62 further text strings which must be found in either conjunction or disjunction with the contents of the search key field 58. Additionally, if permitted on the selected search engine, the user may refine the search by entering into the refinement field 62 a date restriction, for example, to exclude any search results dating more than a month before the calendar entry with which the object is associated, in order to obtain only the most recent information relating to the object.

Alternatively, the user may specify a template which extracts particular strings from the information provided by the calendar application for use in refining the search, for example.

Referring to FIGS. 4 and 5, block 64 then directs the browser 28 and processor 12 shown in FIG. 1 to store an identification of the object, the contents of the search key field, the contents of the scheduled time field and the contents of the search refinement field in corresponding fields 66, 68, 70 and 72 of a search record 74 in a search table 76 shown in FIG. 5. Referring to FIG. 2, the search table 76 is appended or otherwise associated with the calendar user profile produced by the calendar server 36 shown in FIG. 1.

Referring to FIG. 5, the search record 74 also includes a search URL field 78 and a results URL field 80. The search URL field is used to hold a universal resource locator identifying a search engine to be used to conduct the search. In this embodiment, the search URL field 78 is always populated with the same value, for example, a universal resource locator identifying the LYCOS (tm) search engine. It will be appreciated, however, that the dialog box shown in FIG. 4 may further include a field as shown in broken outline at 82, allowing the user to specify a particular search engine which is to be used to carry out the search. The user may enter the word GURU (tm) into the field 82 to identify the gurunet search engine, for example, which provides a reduced volume of search results, and a lookup table (not shown) may be used to specify the URL to be used to populate the corresponding search URL field 78 of the associated search record 74. Alternatively, a field of the dialog box may include a pull-down menu allowing a user to select one or more search engines from a list.

Referring back to FIG. 4, once the search tables have been populated, the search scheduler is completed.

Figure 6:
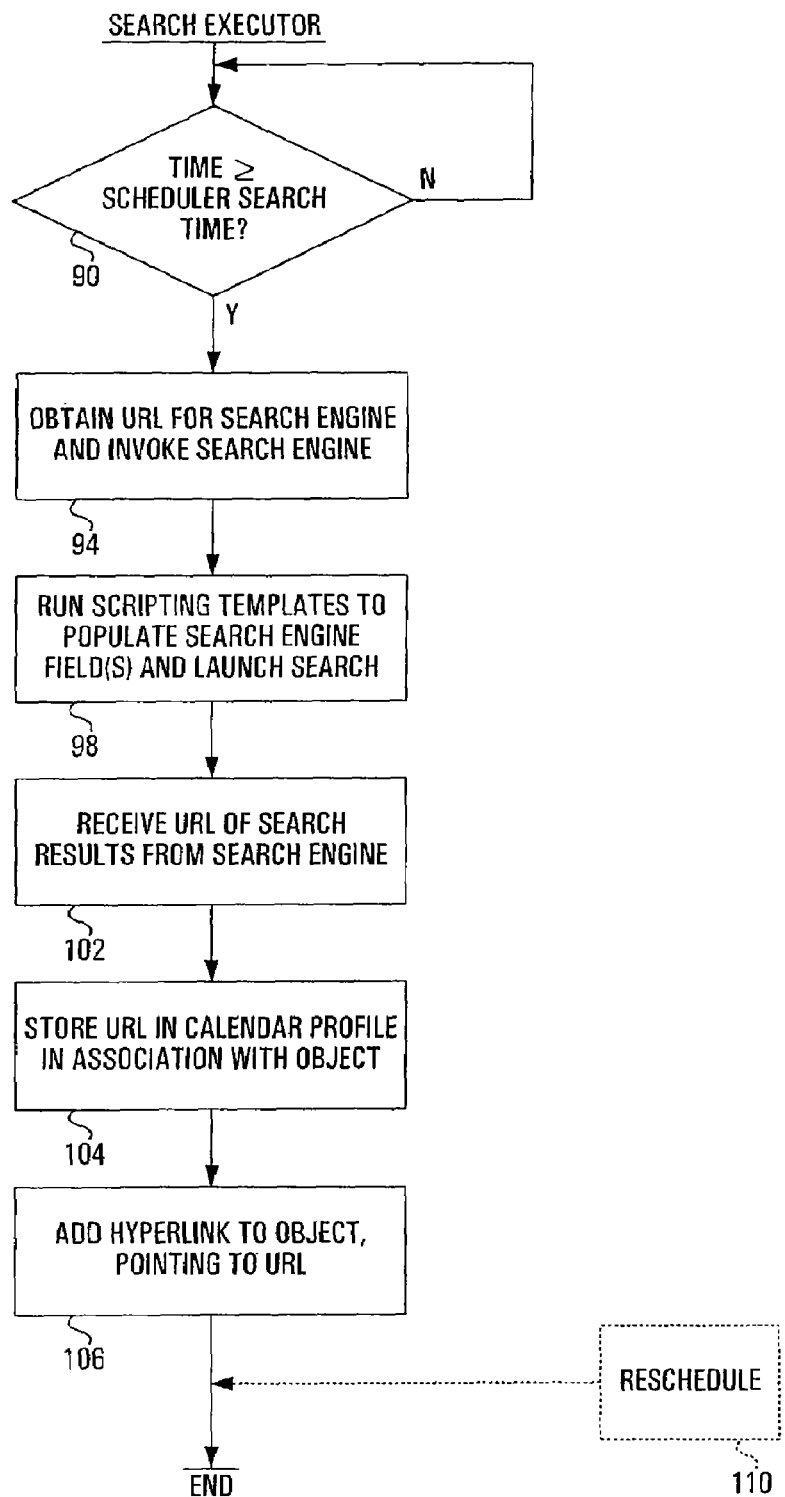
FIG. 6 is a flowchart of a search executor routine executed by the processor of the apparatus shown in FIG. 1.

Referring to FIGS. 1 and 6, the search executor 26 is run by the processor 12 as a background task and includes a first block 90 which directs the processor to scan the search table 76 shown in FIG. 5 to determine whether or not any of the search records 74 in the search table 76 has a scheduled time field 70 identifying a time prior to or equal to a time presently indicated by a clock 92 readable by the processor 12, and if so, whether the results URL field 80 of such a record is empty, indicating that the scheduled search has not yet been conducted. Upon finding such a search record 74, block 94 of the search executor directs the processor to obtain a search URL from the search URL field 78 of the search record 74 and to present the search URL to the browser 28. The browser then uses the contents of the search URL field 78 as a browser location address to cause the browser to establish communications with a search server 96 which in this embodiment is exemplified as LYCOS (tm). The search server 96 presents back to the browser 28 the usual template of search engine fields which a user would normally complete, to specify the parameters of the search, however, block 98 of the search executor directs the processor 12 to run a program, routine, or scripts 100, for example, associated with the applet 16 to populate the search engine fields with the contents of the search key field 58 and the search refinements field 62 of the search record 74 shown in FIG. 5. Also, the program, routine or scripts cause the search to be launched at the search server 96.

The search server 96 performs its search and provides back to the processor and browser, at least one results URL which identifies a location at which the search results may be obtained. Block 102 of the search executor directs the processor 12 to receive the results URL or URLs and block 104 directs the processor to store any such URLs in the results URL field 80 of the search record 74. Thus, the results URL is stored in association with the object tag identified in the object tag field 66 which is associated with the object, hence the results URL is stored in association with the object.

In this embodiment, the results URL includes a URL pointing to a "search results" web-page such as that produced by many search engines, the search results page in turn including a plurality of hyperlinks containing URLs identifying IP addresses of other web sites where information relevant to the search is located. Alternatively, however, a results URL may directly identify an IP address where relevant information is stored, rather than identifying an intermediate IP address where further URLs pointing to the information are stored. If the selected search engine is not capable of providing such a "direct" results URL, block 102 may be further modified to direct the processor to access a search results web-page identified by the supplied URL, and to copy the first five or ten URLs listed therein, for example, into the results URL field 80 of the search table 76.

Block 106 then directs the processor to convert the object tag 52 shown in FIG. 3 into a hyperlink pointing to the URL specified by the contents of the results URL field 80 in the associated search record 74 shown in FIG. 5. Block 106 further directs the processor to modify the HTML file 22 stored in the file memory 24 shown in FIG. 1 by inserting this hyperlink into the file, so that the hyperlinked object tag 52 will be displayed in the user's calendar display 44.

Consequently, referring to FIG. 3, when a user clicks on the object tag 52, a separate frame 108 is produced, and in the separate frame, any information stored at the URL specified by the results URL is displayed. Alternatively, where a plurality of "direct" results URLs are stored in the results URL field 80, block 106 may direct the processor to insert a plurality of respective object tags 52 into the file, each such object tag hyperlinked to a respective results URL. Or, as a further alternative, block 106 may convert the object tag 52 into an embedded menu of hyperlinks to respective results URLs, so that when the user hovers a mouse over the displayed object tag, a small pop-up menu displaying the respective results URLs appears.

Similarly, it will be appreciated that if more than one search URL is stored in the search URL field 78 of the search record 74 shown in FIG. 5, blocks 94, 98, 102, 104 and 106 may be repeated for each such search URL to execute a plurality of searches on respective search engines, and to insert one or more respective object tags 52 hyperlinked to respective results URLs.

While the above embodiment has been described in connection with the use of an HTML file initially prepared by a calendar application, it will be appreciated that the present invention may be used in connection with any file having objects with which resource locators may be associated in order to direct a user to a resource for further information. The resource may be local, such as in memory accessible directly by the processor 12 or accessible by the processor through a network connection, wireless connection, the public switched telephone network or in general any database of information which can be placed in communication with the processor 12.

The ability to schedule the date and time of execution of the search, as indicated in FIG. 4 at the date and time field 60 permits a user to specify that the search is to be performed just before an event, such as a meeting, for example, to provide the user with the latest available information just before going into the meeting, for example. Thus, the present embodiment provides a way of allowing users be automatically kept up to date in respect of matters they specify. To complement this feature, the user may further select search engines which permit searching by date range and may use the search refinements field 62 of the dialog box 56 shown in FIG. 4, to enter appropriate date restrictions into the refinements field 72 shown in FIG. 5, to exclude information dated more than a week or a month ago, for example, to obtain only the most recent "news" relating to the object. More generally, the contents of the refinements field 72 may be used to further refine a search as necessary to focus the search on particular aspects important to the user.

Also, it will be appreciated that the search table shown at 76 in FIG. 5 may include a plurality of search records 74 and that more than one record may be associated with the same object tag to cause searching, for example, to be done at more than one time, for the same information.

It will further be appreciated that the search executor may be extended to include a further block of codes 110 shown in broken outline in FIG. 6, which directs the processor 12 shown in FIG. 1 to reschedule a search by producing a new search record 74 having a different, later time value entered into the scheduled time field 70 to automatically cause a new search to be re-executed at a later time. In this manner, the user can be kept up to date so that whenever the user clicks on the icon or object tag 52 shown in FIG. 3, the information obtained from the last performed search is made available to the user. This feature may be particularly useful for scheduling recurring searches for information relevant to recurring monthly or weekly meetings, for example.

Although the embodiment described above involved storage of the file and user profile information locally at a user's computer, it will be appreciated that the precise location of such information, or of the location from which the search is initiated, is not important. For example, the present invention may alternatively be implemented in an entirely web-based manner. A file, such as a calendar file for example, as well as the full user profile information described above in connection with FIGS. 2 and 5, may be stored entirely at the server 36. The user may access his or her calendar on-line by simply entering an identification such as a username and/or password, for example. The user may then modify his calendar and right-click or strike a hot key sequence to cause the server 36 to download and execute an applet on the user's computer, the applet serving merely to allow the user to interact with a dialog box to enter the contents of the search table 76 into a storage medium at the server 36. At the pre-scheduled time, the server 36 will initiate the search as described above, and modify the contents of the user's calendar file by inserting one or more links to the search results into the calendar file. The user may then remotely access the server 36 to view the modified calendar file stored therein and to access the links to the search results. The user may thus pre-schedule a search to be executed entirely by the server 36, which does not require the user's computer to be turned on at the time when the search is to be performed. Such an embodiment is particularly advantageous for business travellers, who may be away from their home or office computers at the times when the search is to be performed and when they will need to access the search results. Such travellers would thus be able to schedule searches and access results from laptops, or even from public access internet terminals or kiosks located at business conference centres, for example.

While specific embodiments of the invention have been described and illustrated, such embodiments should be considered illustrative of the invention only and not as limiting the invention as construed in accordance with the accompanying claims.

What is claimed is:

1. A computer implemented method of associating search information with an object in a file of an electronic calendar, the method comprising:
   a) storing an object associated with a calendar entry in a file of an electronic calendar;
   b) associating a search key with the object, in said file by tagging the object with a tag;
   c) scheduling a search for said search information using said search key to search resources other than the file of the electronic calendar, for automatic execution at a pre-scheduled time by a searching mechanism;
   d) initiating a pre-scheduled search by said searching mechanism, at said pre-scheduled time to produce a search result in response to said search key;
   e) associating said search result with said tag, in said file; and
   f) modifying contents of said file of said electronic calendar by inserting a copy of a hypertext markup language (HTML) file corresponding to one or more uniform resource locator (URL) links to said tag associated with said search result into said file of said electronic calendar.

2. The computer implemented method claimed in claim 1 wherein tagging the object comprises associating a label with the object.

3. The computer implemented method claimed in claim 2 wherein associating a label comprises inserting said tag adjacent a string of text in a document.

4. The computer implemented method claimed in claim 1 wherein scheduling comprises storing said search key and a time of execution at which said search is to be executed in association with each other.

5. The computer implemented method claimed in claim 1 wherein scheduling comprises storing said search key in association with a time of execution at which said search is to be executed and in association with a tag identifying said object.

6. The computer implemented method of claim 1 wherein associating said search result with said tag comprises providing a hyperlink for accessing and displaying said search results.

7. A recording medium readable by a computer, tangibly embodying a program of instructions executable by said computer to perform a method of associating search information with an object in a file of an electronic calendar, the method comprising the steps to:
   a) store an object associated with a calendar entry in a file of an electronic calendar;
   b) associate a search key with an object, in a file by tagging the object with a tag;
   c) schedule a search for information using said search key to search resources other than the file of the electronic calendar, for automatic execution at a pre-scheduled time by a searching mechanism;
   d) initiate a prescheduled search by said searching mechanism, at said pre-scheduled time to produce a search result in response to said search key;
   e) associate said search result with said tag, in said file; and
   f) modify contents of said file of said electronic calendar by inserting a copy of a hypertext markup language (HTML) file corresponding to one or more uniform resource locator (URL) links to said tag associated with said search result into said file of said electronic calendar.

8. An apparatus for associating information with an object in a file, the apparatus comprising:
   a) means for storing an object associated with a calendar entry in a file of an electronic calendar;
   b) means for associating a search key with the object, in said file by tagging the object with a tag;
   c) means for scheduling a search for said information using said search key to search resources other than the file of the electronic calendar, for automatic execution at a pre-scheduled time by a searching mechanism;
   d) means for initiating a pre-scheduled search by said searching mechanism, at said pre-scheduled time to produce a search result in response to said search key;
   e) means for associating said search result with said tag, in said file; and
   f) means for modifying contents of said file of said electronic calendar by inserting a copy of a hypertext markup language (HTML) file corresponding to one or more uniform resource locator (URL) links to said tag associated with said search result into said file of said electronic calendar.

9. An apparatus for associating search information with an object associated with a calendar entry in a file of an electronic calendar, the apparatus comprising:
   a scheduler operable to schedule a search for said information, said scheduler including:
   a component for storing the object in said file and for associating a search key and a time of execution with the object, in the file by tagging the object with a tag; and
   an executor operable to automatically initiate a pre-scheduled search for said information, at said time of execution, said executor including:
   a component for communicating with a search engine configured to search a resource other than said file of the electronic calendar at said time of execution to effect said pre-scheduled search in response to said search key and to receive a search result from said search engine;
   a component for associating said search result with said tag, in said file; and
   a component for modifying contents of said file of said electronic calendar by inserting a copy of a hypertext markup language (HTML) file corresponding to one or more uniform resource locator (URL) links to said tag associated with said search result into said file of said electronic calendar.

10. The apparatus claimed in claim 9 wherein said scheduler is operable to associate a label with the object.

11. The apparatus claimed in claim 10 wherein said scheduler is operable to insert said tag adjacent a string of text in a document.

12. The apparatus claimed in claim 9 wherein said scheduler comprises memory and wherein said scheduler is operable to store said search key and a time of execution at which said search is to be executed in association with each other.

13. The apparatus claimed in claim 9 wherein said scheduler is operable to store said search key in association with a time of execution at which said search is to be executed and in association with a tag identifying said object.

14. The apparatus of claim 9 wherein said component for associating said search result with said tag comprises a hyperlink for accessing and displaying said search results.

15. A computer implemented method of associating information with an object associated with a calendar entry in a file of an electronic calendar, the method comprising:
   a) initiating a search for said information through a resource other than said file of the electronic calendar, using a search key and an associated time of execution associated with said object by a tag associated with the object in said file;
   b) associating with said tag a result of said search; and
   c) modifying contents of said file of said electronic calendar by inserting a copy of a hypertext markup language (HTML) file corresponding to one or more uniform resource locator (URL) links to said tag associated with said search result into said file of said electronic calendar.

16. The computer implemented method claimed in claim 15 wherein initiating comprises invoking a search when, or after said time of execution occurs.

17. The computer implemented method claimed in claim 16 wherein invoking a search comprises invoking a search engine.

18. The computer implemented method claimed in claim 17 wherein invoking a search engine comprises addressing a universal resource locator (URL) associated with said search engine.

19. The computer implemented method claimed in claim 18 wherein invoking said search comprises running scripts to populate search engine fields of the search engine.

20. The computer implemented method claimed in claim 15 further comprising associating with the object a hyperlink pointing to said one or more ULR links, where said one or more URL links are results URL.

21. The computer implemented method claimed in claim 20 further comprising producing a table associating said tag, said search key, said time of execution, said URL associated with said search and said results URL with each other.

22. The computer implemented method of claim 15 wherein associating said result of said search with said tag comprises providing a hyperlink for accessing and displaying said search results.

23. A recording medium readable by a computer, tangibly embodying a program of instructions executable by said computer to perform a method of associating search information with an object in a file of an electronic calendar, the method comprising the steps to:
   a) initiate a search for information through a resource other than said file of the electronic calendar, using a search key and an associated time of execution associated with an object in a file by a tag associated with the object in said file; and
   b) associate with said tag a result of said search; and
   c) modify contents of said file of said electronic calendar by inserting a copy of a hypertext markup language (HTML) file corresponding to one or more uniform resource locator (URL) links to said tag associated with said search result into said file of said electronic calendar.

24. A computer apparatus for associating information with an object associated with a calendar entry in a file of an electronic calendar, the apparatus comprising:
   a) means for initiating a search for said information through a resource other than said file of the electronic calendar, using a search key and an associated time of execution associated with said object by a tag associated with the object in said file; and
   b) means for associating with said tag a result of said search; and
   c) modifying contents of said file of said electronic calendar by inserting a copy of a hypertext markup language (HTML) file corresponding to one or more uniform resource locator (URL) links to said tag associated with said search result into said file of said electronic calendar.

25. A computer apparatus for associating search information with an object associated with a calendar entry in a file of an electronic calendar, the apparatus comprising: a search executor for initiating a search for said information through a resource other than said file of the electronic calendar, using a search key and an associated time of execution associated with said object by a tag associated with the object in said file, for associating with said tag a result of said search, and for modifying contents of said file of said electronic calendar by inserting a copy of a hypertext markup language (HTML) file corresponding to one or more uniform resource locator (URL) links to said tag associated with said search result into said file of said electronic calendar.

26. The computer apparatus claimed in claim 25 wherein said search executor is operable to invoke a search when, or after said time of execution occurs.

27. The computer apparatus claimed in claim 26 wherein said search executor is operable to invoke a search engine.

28. The computer apparatus claimed in claim 27 wherein said search executor is operable to address a universal resource locator (URL) associated with said search.

29. The computer apparatus claimed in claim 28 wherein said search executor is operable to run scripts to populate search engine fields of the search engine.

30. The computer apparatus claimed in claim 28 wherein said one or more URL links are results URL associated with results of said search.

31. The computer apparatus claimed in claim 30 wherein said search executor comprises memory and wherein said search executor is operable to store said results URL in association with said search.

32. The computer apparatus claimed in claim 31 wherein said search executor is operable to associate with the object a hyperlink pointing to said results URL.

33. The computer apparatus claimed in claim 32 wherein said search executor is operable to produce a table associating said object tag, said search key, said time of execution, said URL associated with said search and said results URL with each other.

34. The computer apparatus of claim 25 further comprising means for providing a hyperlink for accessing and displaying said search results.

* * * * *